(12) United States Patent
Newman

(10) Patent No.: US 10,208,650 B2
(45) Date of Patent: Feb. 19, 2019

(54) MONITORING ENGINE COOLANT

(71) Applicant: Ford Global Technologies, LLC, Dearborn, MI (US)

(72) Inventor: Carl Stephen Newman, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/493,009

(22) Filed: Apr. 20, 2017

(65) Prior Publication Data

US 2017/0335751 A1 Nov. 23, 2017

(30) Foreign Application Priority Data

May 18, 2016 (GB) .................................. 1608719.9

(51) Int. Cl.
| | | |
|---|---|---|
| F01P 11/16 | (2006.01) |
| G01F 23/22 | (2006.01) |
| G01K 1/02 | (2006.01) |
| G01K 13/02 | (2006.01) |
| G01R 31/02 | (2006.01) |
| G01K 7/16 | (2006.01) |
| G01F 23/24 | (2006.01) |

(52) U.S. Cl.
CPC .............. *F01P 11/16* (2013.01); *G01F 23/22* (2013.01); *G01F 23/241* (2013.01); *G01F 23/247* (2013.01); *G01K 1/024* (2013.01); *G01K 7/16* (2013.01); *G01K 13/02* (2013.01); *G01R 31/025* (2013.01); *F01P 2025/08* (2013.01); *F01P 2031/20* (2013.01); *F01P 2031/22* (2013.01); *G01K 2013/026* (2013.01); *G01K 2205/00* (2013.01)

(58) Field of Classification Search
CPC .... F01P 11/14; F01P 2031/00; F01P 2023/08; F01P 2025/08; F01P 2031/20; F01P 2031/22; F01P 7/16
See application file for complete search history.

(56) References Cited

U.S. PATENT DOCUMENTS

| | | | | |
|---|---|---|---|---|
| 2,605,339 A | * | 7/1952 | Connolly ............... | G08B 21/00 200/83 R |
| 2,957,348 A | * | 10/1960 | Walker, Jr. ............... | G01K 5/62 374/145 |
| 3,614,730 A | | 10/1971 | Bozoian | |
| 5,521,581 A | * | 5/1996 | Proulx ..................... | F01P 11/14 123/41.14 |

(Continued)

FOREIGN PATENT DOCUMENTS

| | | | | |
|---|---|---|---|---|
| CN | 202903362 U | * | 4/2013 | |
| CN | 202903362 U | * | 4/2013 | |

(Continued)

OTHER PUBLICATIONS

Machine translations of CN203376075 and CN202903362.*

(Continued)

*Primary Examiner* — Long T Tran
(74) *Attorney, Agent, or Firm* — Julia Voutyras; McCoy Russell LLP

(57) ABSTRACT

An engine coolant temperature sensor configured to earth through the engine coolant such that an alarm will trigger when coolant is absent.

18 Claims, 3 Drawing Sheets

(56) References Cited

U.S. PATENT DOCUMENTS

| | | | | |
|---|---|---|---|---|
| 5,708,412 | A | * | 1/1998 | Proulx .................... F01P 11/14 340/449 |
| 6,184,768 | B1 | * | 2/2001 | Hsu ........................ H01H 61/02 337/318 |
| 7,335,054 | B2 | * | 2/2008 | Nakazawa ............. H01R 31/08 439/510 |
| 7,542,843 | B2 | | 6/2009 | Malone et al. |
| 2004/0159290 | A1 | * | 8/2004 | Skrzypchak ............. F01P 3/12 123/41.31 |
| 2006/0128185 | A1 | * | 6/2006 | Nakazawa ............. H01R 31/08 439/92 |
| 2013/0177122 | A1 | * | 7/2013 | Fushimi ............... G21C 17/035 376/247 |

FOREIGN PATENT DOCUMENTS

| | | | |
|---|---|---|---|
| CN | 203376075 U | * | 1/2014 |
| CN | 203376075 U | * | 1/2014 |
| FR | 2245854 A1 | | 4/1975 |
| GB | 1375372 A | | 11/1974 |
| GB | 2518670 A | | 4/2015 |
| JP | 11026141 A | * | 1/1999 |

OTHER PUBLICATIONS

Translation of CN202903362U.*

"Code No. P0118: Engine Coolant Temperature Sensor Circuit High Input," Retrieved online at http://outlander.2de.ru/13/html/M113177490016900ENG.HTM, Available as Early as Jan. 14, 2016, Substantively similar website aurrently available online at http://mmc-autoelectric.org.ua/manuals/eur/1200/2009/13/html/M113350080037000ENG.HTM, 7 pages.

Intellectual Property Office of Great Britain, Combined Search and Examination Report Issued in Application No. GB1608719.9, dated Nov. 9, 2016, South Wales, 5 pages.

* cited by examiner

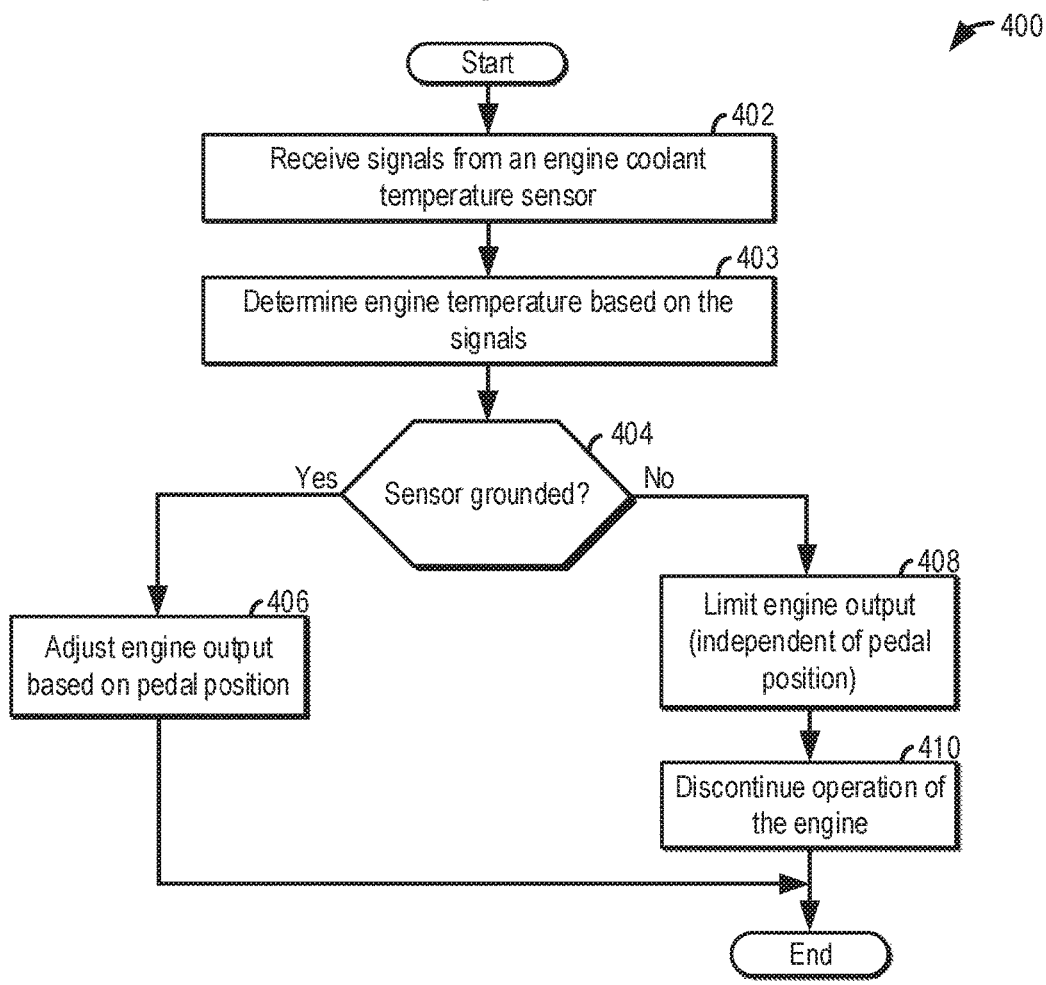

MONITORING ENGINE COOLANT

CROSS REFERENCE TO RELATED APPLICATION

The present application claims priority to Great Britain Patent Application No. 1608719.9, filed on May 18, 2016. The entire contents of the above-referenced application are hereby incorporated by reference in its entirety for all purposes.

BACKGROUND

The provision of a device for sensing the temperature of engine coolant is commonplace in the automotive arts as the temperature of the coolant can provide an indication of the temperature within the engine. In order to ensure efficient operation, the engine and therefore the coolant, needs to be maintained within a predetermined range of temperatures.

If the coolant is lost, the temperature sensor will not identify this problem, because the air temperature is likely to remain within the predetermined range of temperatures. However, the absence of coolant can have considerable adverse consequences in terms of the operation of the engine.

It is against this background that the present invention has arisen.

SUMMARY

The Inventors have recognized the abovementioned problems and developed systems and methods that enable improvements in or relating to monitoring of engine coolant and, in particular, to monitoring both the presence and temperature of said coolant.

In one aspect there is provided an engine coolant temperature sensor configured to earth through the engine coolant such that an alarm will trigger when coolant is absent.

The provision of a sensor that provides the combined functions of an engine coolant temperature sensor and a sensor identifying the absence of coolant has the ability to save the entire engine in a situation where the coolant has escaped. Providing this additional functionality within the temperature sensor reduces cost and complexity in comparison with the provision of a separate coolant level sensor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The invention will now be further and more particularly described, by way of example only, and with reference to the accompanying drawings, in which:

FIG. 4 shows a method for operation of an engine system.

DETAILED SPECIFICATION

An engine coolant temperature sensor providing dual use functionality is described herein. Specifically, the engine coolant temperature sensor is configured to detect both engine temperature and the presence of coolant in a coolant conduit. Consequently, the cost and complexity of the engine in which the dual use sensor is employed can be reduced when compared to engines using two separate sensors. Moreover, the dual use sensor can be used for engine cooling system diagnostics, if desired. For instance, coolant leaks may be diagnosed using the sensor. In turn, an affirmative leak diagnosis may trigger an alarm (e.g., audio and/or visual alarm) and/or prompt engine deactivation and/or engine output restriction, for example. Consequently, actions, taken by the driver or automatically triggered, that reduce the chance of engine overheating damage may be carried out when a coolant leak is identified.

The engine coolant temperature sensor may have a metal housing which may incorporate a wire that is configured to enable the sensor to earth through the coolant in use. If the engine suffers a loss of coolant, the sensor will lose the earth connection which had previously been established through the coolant.

The alarm may be an audible alarm or it may be a visual alarm. In some embodiments both audible and visual alarms may be combined. The purpose of the alarm is to attract the driver's attention and urge the driver to quickly (e.g., without delay) switch off the engine in order to allow for the engine to cool down and for replacement coolant to be provided. Furthermore, the circumstances resulting in the lack of coolant may also be investigated, by the driver, to ensure that the problem is not perpetuated.

If the alarm is a visual alarm it may take the form of a light on the vehicle dashboard. This positioning may be selected to ensure that the driver observes the light and is notified to take immediate action.

Furthermore, the alarm may be linked to the vehicle ECU and may force the vehicle in to a "limp home" mode. The "limp home" mode may be intended to provide the driver with a small amount of leeway in stopping the vehicle to enable the driver to select a place to stop to avoid the driver and other vehicle occupants from being placed in unnecessary danger as a result of the location of the vehicle at the time of the fault. For example, the vehicle may be configured to allow movement at a limited speed for a short distance before cutting the engine completely.

Figure 1:
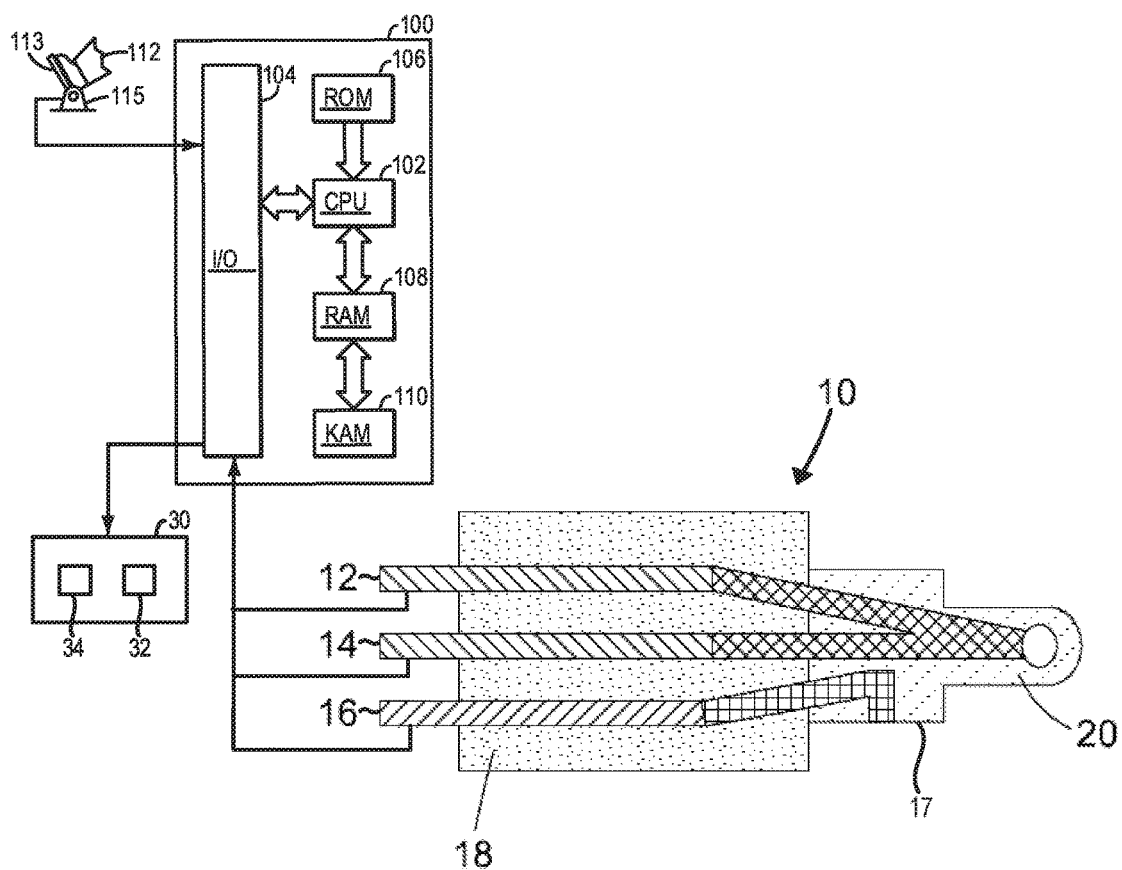
FIG. 1 is a schematic cross section through a coolant sensor of the present invention.

FIG. 1 shows an engine coolant temperature sensor 10 which includes two temperature sensing wires 12 and 14 as well as an earth wire 16. All three wires 12, 14, and 16 are encased in a housing 18, which is provided with a separable metal tip 20, in the depicted example. In other words, the housing 18 encloses the temperature sensing wires 12 and 14 as well as the earth wire 16. The temperature sensing wires 12 and 14 may sense the temperature of the fluid adjacent to the metal tip 20 by measuring the resistance through the metal tip 20. Under normal operating conditions, the metal tip 20 is submerged in liquid coolant and the temperature sensing wires 12 and 14 therefore sense a temperature of the coolant liquid. The temperature data obtained by the engine coolant temperature sensor 10 may then be provided to a vehicle engine control unit or ECU. The ECU may take the form of the controller 100, discussed in greater detail herein. Provided the sensed temperature remains within a predetermined range, the coolant is assumed to be fit for purpose. However, if the coolant fluid is lost, the engine coolant temperature sensor will continue to function and the temperature sensed will be that of the air adjacent to the metal tip 20 of the engine coolant temperature sensor 10. Whilst this temperature might be within the predetermined acceptable range for liquid coolant, the air cannot cool the engine sufficiently and the absence of coolant can result in the temperature of the engine exceeding acceptable operating range, resulting in failure of the engine.

The earth wire 16 is connected (e.g., electrically connected) to the metal tip 20 of the engine coolant temperature sensor in order to provide an earth connection through the coolant fluid. As described herein, an earth connection may be an electrical connection providing a common return path for an electric current and/or a direct physical connection to the earth, also referred to as a ground connection.

The sensing wires 12 and 14 are shown spaced away from (e.g., not in electrical contact with) the earth wire 16 in the housing 18. Additionally, the earth wire 16 is shown extending through a central portion of the sensor to an outer surface 17 of the metal tip 20. Thus, the earth wire 16 includes a portion radially extending outward toward the outer surface 17 and electrically interfacing with the metal tip 20, in the illustrated example. However, other contours of the earth wire 16 have been contemplated. For instance, the earth wire 16 may extend through the housing 18 to an inner surface of the metal tip 20. It will be appreciated that the outer surface 17 may be an interface between the sensor and coolant or air, depending on the level of coolant in the conduit in which the sensor is located.

If the coolant fluid is lost, the metal tip 20 cannot earth to anything and therefore the earth connection is broken. The engine coolant temperature sensor 10 may trigger an alarm 30, when the earth connection is lost. Therefore, if the coolant fluid level drops sufficiently that the metal tip 20 of the engine coolant temperature sensor 10 is no longer submerged in the coolant fluid, then the alarm 30 may be triggered, in one example. The alarm 30 may include an audio component 32 (e.g., speaker) and a visual component 34 (e.g., display, electric light, etc.) The audio component and visual component therefore may alert the driver of a loss of coolant in the engine cooling system. Consequently, a user can take action to mitigate deleterious effects of coolant loss, such as engine shutdown and/or limiting engine output, to reduce the likelihood of the engine reaching hazardous temperatures. The housing 18 of the engine coolant temperature sensor may be predominantly a plastic housing with only the tip 20 being metal, in one example. This ensures that the engine coolant temperature sensor 10 does not earth through its mounting location, but is instead forced to earth through the coolant fluid. In such an example, the plastic housing of the engine coolant temperature sensor 10 may be in contact with the mounting portion in the cylinder head 28. The extent of the metal tip 20 may be reduced (e.g., minimized) in order to reduce (e.g., minimize) the cost and weight of the engine coolant temperature sensor 10. In other embodiments, not shown in the accompanying drawings, a greater proportion of the housing may be metal. Additionally, FIG. 1 shows the wires 12 and 14 as well as earth wire 16 extending through the metal tip 20. However, in other examples, such as the embodiment shown in FIG. 2, the metal tip 20 may have the form of a removable sleeve that at least partially surrounds the housing 18.

Figure 2:
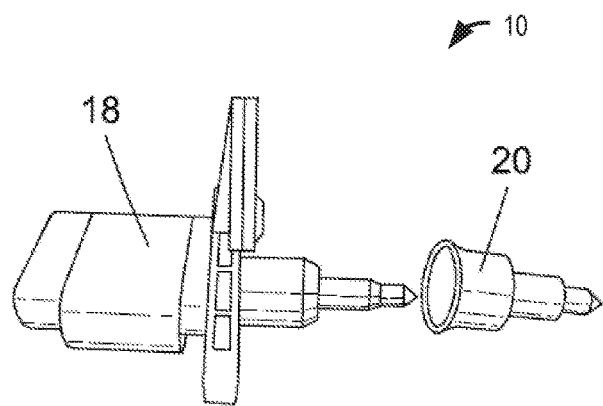
FIG. 2 is one embodiment of a coolant sensor according to the present invention.

FIG. 2 shows the engine coolant temperature sensor 10 with the metal tip 20 removed. The plastic housing 18 holds the temperature sensing wires 12 and 14 and the earth wire 16. The earth wire 16 protrudes such that, when the metal tip 20 is engaged with the plastic housing 18, the earth wire 16 forms an electrical connection with the metal tip 20. The earth wire 16 and metal tip 20 effectively provide a coolant presence sensor as the absence of coolant liquid adjacent to the metal tip 20 will result in the earth connection being lost.

The engine coolant temperature sensor 10 shown in FIGS. 1 and 2 therefore provides a dual function: identifying the presence of coolant and also providing temperature reading for the fluid adjacent to the engine coolant temperature sensor 10. The provision of both functions within a single sensor obviates the need for a separate coolant level sensor, if desired. The dual function engine coolant temperature sensor 10 has only the same packaging requirements as a single function temperature sensor and therefore can be retrofitted into a location previously occupied by a temperature sensor. In an environment where space is at a premium, the provision of the two functions within a single sensor provides an efficient use of space as well as a reduction in cost in comparison with the provision of two separate sensors.

FIG. 1 also shows a controller 100. Specifically, controller 100 is shown in FIG. 1 as a conventional microcomputer including: microprocessor unit 102, input/output ports 104, read-only memory 106, random access memory 108, keep alive memory 110, and a conventional data bus. Controller 100 is configured to receive various signals from sensors coupled to engine 22, shown in FIG. 3. The sensors may include engine coolant temperature sensor 10, exhaust gas sensors (not shown), an intake airflow sensor (not shown), etc. Thus, the controller 100 may receive signals from the wires 12, 14, and 16 in the engine coolant temperature sensor 10. Additionally, the controller 100 is also configured to receive throttle position (TP) from a throttle position sensor 115 coupled to a pedal 113 actuated by an operator 112.

Additionally, the controller 100 may be configured to trigger one or more actuators and/or send commands to components. For instance, the controller 100 may trigger the alarm 30 when it is determined that there is a coolant leak in the engine. The controller 100 may also send commands or trigger actuators in the engine 22 and the engine system 23, shown in FIG. 3. Therefore, the controller 100 receives signals from the various sensors and employs the various actuators to adjust engine operation based on the received signals and instructions stored in memory of the controller. It will be appreciated that the controller 100 may be included in the engine system 23, shown in FIG. 3, in one example.

Figure 3:
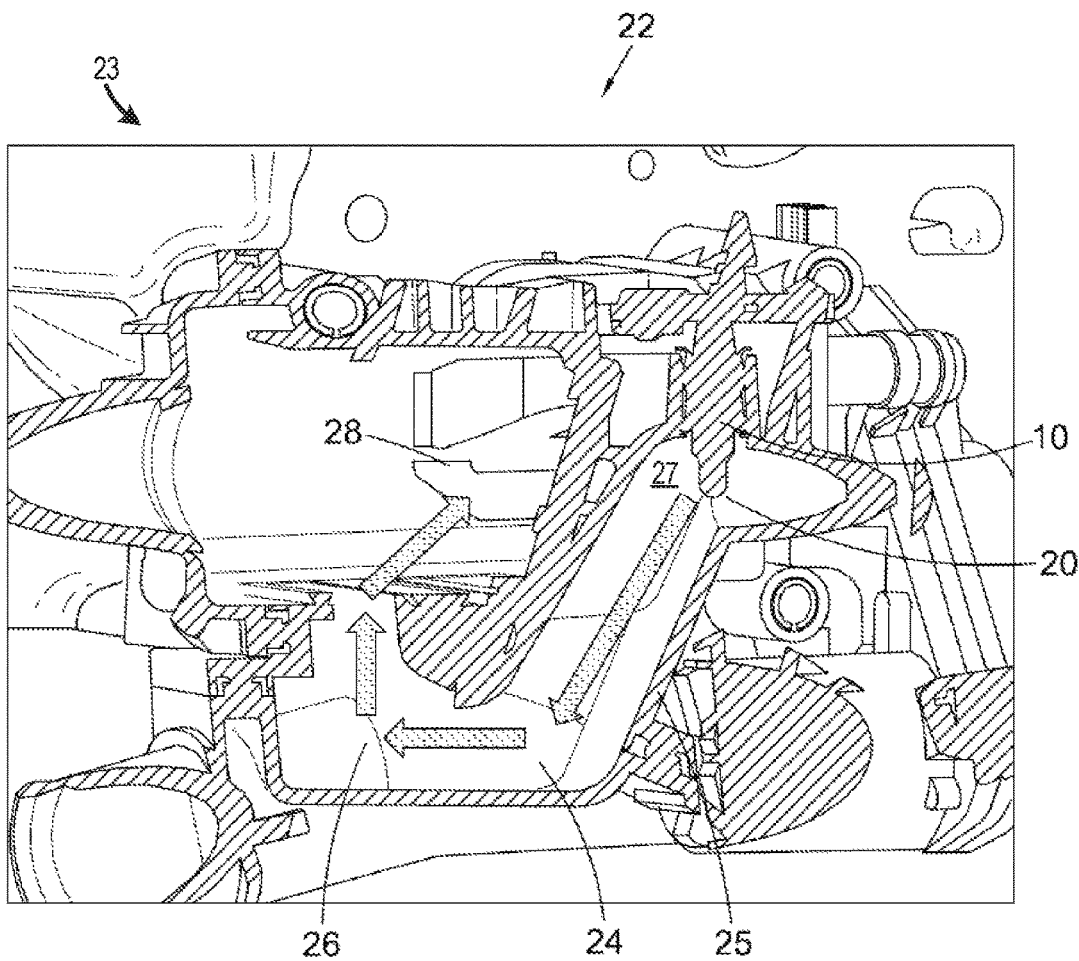
FIG. 3 shows the location of the coolant sensor of the present invention within an engine.

FIG. 3 shows the engine coolant temperature sensor 10 in the context of part of a vehicle engine 22 and engine system 23. The engine system 23 may include the engine coolant temperature sensor 10, the controller 100 shown in FIG. 1, the engine 22, and the cylinder head 28, in one example. However it will be appreciated that the engine system 23 may include additional or alternative components, in other examples. The engine 22 is shown in cross section with the engine coolant temperature sensor 10 in position at the highest point in the coolant flow path 24 which is enclosed by a plastic housing 25 of a coolant conduit 27. Specifically, the engine coolant temperature sensor 10 extends into the coolant conduit 27 such that at least a portion of the metal tip 20 is located within the coolant conduit 27. However, it will be appreciated that other positions of the engine coolant temperature sensor 10 have been contemplated. The coolant 26 is present throughout the tortuous path 24 that leads to the cylinder head 28. The cylinder head 28 is metal and connected to the vehicle chassis (not shown). The cylinder head 28 therefore provides the earth location for the engine coolant temperature sensor 10. The coolant 26 provides the transmission conduit for the earth connection from the metal tip 20 of the engine coolant temperature sensor 10 to the cylinder head 28. Thus, it will be appreciated that the coolant 26 and cylinder head 28 provide a grounded path for the metal tip 20 in the engine coolant temperature sensor 10. If the level of the coolant 26 drops such that it no longer touches the metal tip 20 of the engine coolant temperature sensor 10, then the earth connection is broken and the alarm 30, shown in FIG. 1, may be triggered.

Turning back to the features of the controller 100, shown in FIG. 1, the controller may be configured to trigger the alarm 30 when the ground connection of the engine coolant temperature sensor 10 is broken. Thus, the controller 100 may specifically be configured to determine if a coolant level in the coolant conduit 27 is below a threshold level based on signals from the earth wire 16. As previously discussed, the coolant level threshold may be indicative of an engine coolant leak. Responsive to determining the coolant level is below the threshold level, the controller 100 may also be configured to trigger engine deactivation. Additionally or alternatively, responsive to determining the coolant level is below the threshold level, the controller may limit engine output independent of driver demand when it is determined that the coolant level in the coolant conduit is below the threshold level. On the other hand, if the controller 100 determines that the coolant level is above the threshold level the controller may adjust engine output based on driver demand (e.g., pedal position). Furthermore, the controller 100 may be configured to determine engine temperature from the signals received from the engine coolant temperature sensor 10 and specifically the temperature sensing wires 12 and 14.

FIG. 4 shows a method 400 for operation of an engine system to diagnose coolant leaks. The method 400 may be implemented by the engine system including the engine coolant temperature sensor discussed above or may be implemented by another suitable engine system, in other instances.

At 402 the method includes receiving signals from an engine coolant temperature sensor positioned in an engine coolant conduit. It will be appreciated that receiving temperature sensor signals includes receiving signal from an earth wire in the engine coolant temperature sensor and/or signals from temperature sensing wires in the sensor. At 403 the method includes determining engine temperature based on the signals from the engine coolant temperature sensor.

Next at 404 the method includes determining if the engine coolant temperature sensor is grounded based on the sensor signals. It will be appreciated that grounding of the engine coolant temperature sensor indicates the presence of coolant in the conduit in which the sensor is positioned. Likewise, an ungrounded engine coolant temperature sensor indicates the absence of coolant (e.g., a coolant leak) in the coolant conduit in which the sensor is positioned. Therefore, in other examples it may be determined if the engine coolant level is above or below a threshold value based on the engine coolant temperature sensor signals.

If it is determined that the engine coolant temperature sensor is grounded (YES at 404) the method advances to 406 where the method includes adjusting engine output based on pedal position. In this way, the engine may be operated based on driver demand when it is determined the coolant system has a desirable amount of coolant flowing through the coolant conduits. It will therefore be appreciated that pedal position may be indicative of driver demand. However, other actuator inputs may additionally or alternatively signify driver demand.

However, if it is determined that the engine coolant temperature sensor is not grounded (NO at 404) the method advances to 408. At 408 the method includes limiting engine output. For instance, an upper threshold value may be used to limit engine output to decrease the likelihood of engine damage caused by overheating stemming from a coolant leak. The engine output is limited irrespective of the pedal position, in the depicted example. Accordingly, a driver's requested engine power output may be constrained to prevent engine damage.

Next at 410 the method includes discontinuing operation of the engine. Discontinuing operation of the engine may include ceasing combustion operation in the engine. Shutting down the engine enable the likelihood of engine damage caused by overheating to be further reduced. In yet another example, engine operation may be discontinued, after a duration of limited engine output, to enable a driver to move the vehicle to a safe location before it is disabled. However in other examples, engine operation may be discontinued directly after it is determined that the engine coolant temperature sensor is ungrounded. Method 400 enables a dual-use temperature sensor to be employed in cooling system diagnostics. As a result, sensor signals can be used, not only to determine engine temperature, but also to trigger actions or prompt a driver to take actions that mitigate the risk of engine overheating when the ground wire signals indicate the engine is leaking coolant.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being triangular, helical, straight, planar, curved, rounded, spiral, angled, or the like). Further, elements shown intersecting one another may be referred to as intersecting elements or intersecting one another, in at least one example. Further still, an element shown within another element or shown outside of another element may be referred as such, in one example.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine coolant temperature sensor comprising:
an earth wire configured to earth through engine coolant in a coolant conduit and trigger an alarm when coolant is absent in the coolant conduit, wherein the only connection of the earth wire within the temperature sensor is to a housing.

2. The engine coolant temperature sensor according to claim 1, wherein the housing is in electrical contact with the earth wire and the housing is composed of metal.

3. The engine coolant temperature sensor according to claim 2, further comprising a plurality of temperature sensing wires spaced away from the earth wire.

4. The engine coolant temperature sensor according to claim 1, wherein the alarm is an audible alarm.

5. The engine coolant temperature sensor according to claim 1, wherein the alarm is a visual alarm.

6. An engine system comprising:
an engine coolant temperature sensor including,
a plurality of temperature sensing wires enclosed in a housing,
an earth wire enclosed in the housing and spaced away from the plurality of temperature sensing wires, and
a controller receiving signals from the earth wire and signals from the plurality of temperature sensing wires and determining if a coolant level in a coolant conduit in which the engine coolant temperature sensor is positioned is below a threshold level based on the signals from the earth wire.

7. The engine system of claim 6, further comprising a metal tip at least partially surrounding the housing.

8. The engine system of claim 7, where the earth wire is in electrical contact with the metal tip.

9. The engine system of claim 6, where the engine coolant temperature sensor extends into the coolant conduit.

10. The engine system of claim 6, where the controller triggers engine deactivation when it is determined that the coolant level in the coolant conduit is below the threshold level.

11. The engine system of claim 6, where the controller limits engine output independent of driver demand when it is determined that the coolant level in the coolant conduit is below the threshold level.

12. The engine system of claim 6, where the controller determines engine temperature based on the signals from the plurality of temperature sensing wires.

13. A method for operating an engine system comprising:
determining an engine temperature based on signals from a plurality of temperature sensing wires in an engine coolant temperature sensor; and
determining if the engine coolant temperature sensor is grounded based on signals from an earth wire in the engine coolant temperature sensor, wherein the earth wire is not connected to the plurality of temperature sensing wires.

14. The method of claim 13, further comprising, if it is determined that the engine coolant temperature sensor is grounded, discontinuing engine operation.

15. The method of claim 13, further comprising limiting engine output independent of driver demand when the engine coolant temperature sensor is determined to be grounded.

16. The method of claim 13, further comprising adjusting engine output based on driver demand when the engine coolant temperature sensor is determined to be not grounded.

17. The method of claim 13, where the earth wire is spaced away from the plurality of temperature sensing wires.

18. The method of claim 13, where the earth wire is in electrical contact with a metal tip of the engine coolant temperature sensor.

* * * * *